I. N. MORRIS.
SALT AND PEPPER DISPENSER.
APPLICATION FILED FEB. 14, 1916.
1,219,475.
Patented Mar. 20, 1917.
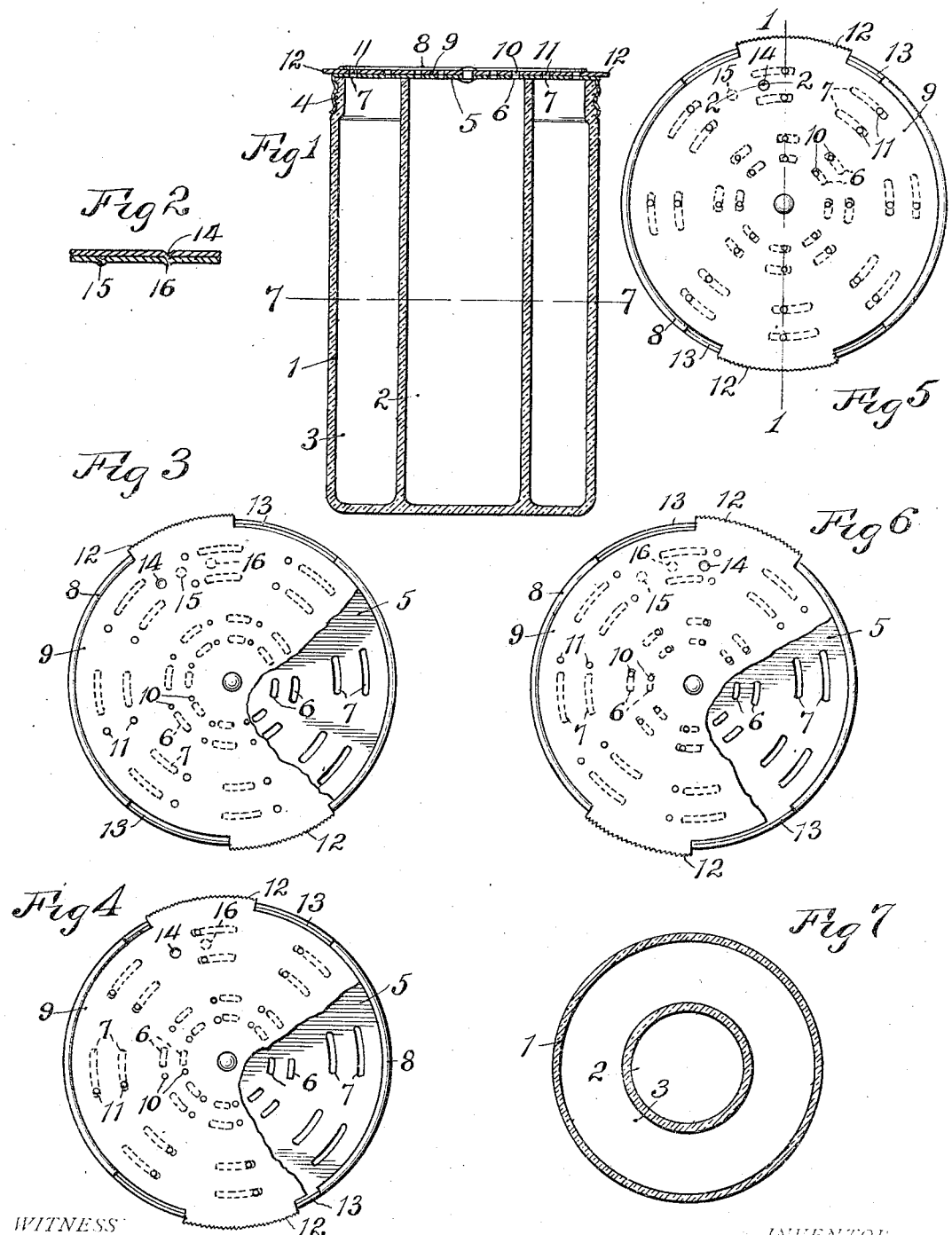

UNITED STATES PATENT OFFICE.

IRL N. MORRIS, OF KANSAS CITY, MISSOURI.

SALT AND PEPPER DISPENSER.

1,219,475.

Specification of Letters Patent. Patented Mar. 20, 1917.

Application filed February 14, 1916. Serial No. 78,255.

*To all whom it may concern:*

Be it known that I, IRL N. MORRIS, a citizen of the United States, residing at Kansas City, in the county of Jackson and State of Missouri, have invented a certain new and useful Improvement in Salt and Pepper Dispensers, of which the following is a specification.

My invention relates to improvements in salt and pepper dispensers.

The object of my invention is to provide in a single article a container for salt and a container for pepper, and provided with means by which salt and pepper may be alternately or simultaneously dispensed therefrom.

My invention provides further novel features of construction, which enable the device to be cheaply manufactured, easily operated and not liable to get out of order.

The novel features of my invention are hereinafter fully described and claimed.

In the accompanying drawing, which illustrates the preferred embodiment of my invention, Figure 1 is a vertical central sectional view of my improved salt and pepper dispenser, on the line 1—1 of Fig. 5.

Fig. 2 is an enlarged vertical sectional view on the curved line 2—2 of Fig. 5.

Fig. 3 is a plan view, showing the oscillatable member in the closed position and partly broken away, Fig. 4 is a view similar to Fig. 3, showing the oscillatable member in the position for discharging salt.

Fig. 5 is a view similar to Fig. 3, showing the oscillatable member in position for discharging pepper and salt.

Fig. 6 is a view similar to Fig. 3, showing the oscillatable member in position for discharging pepper.

Fig. 7 is a horizontal section on the line 7—7 of Fig. 1.

Similar reference characters designate similar parts in the different views.

The body 1 of the dispenser may be of any desired form. In the drawing, it is shown as cylindrical, and is provided with a central chamber 2 adapted to contain pepper, and an annular chamber 3 inclosing the wall of the chamber 2 and adapted to contain salt.

The body 1 is provided at its upper end with a screw-threaded peripheral portion 4 adapted to have detachably fitted to it a screw-cap comprising a cover 5 which is provided above the pepper chamber 2 with a series of concentrically arranged rows of perforations 6, preferably consisting of narrow arcuate slots.

The cover 5 above the salt chamber 3 is provided with a series of concentric rows of perforations 7, also consisting preferably of arcuate slots, which are wider than the perforations 6.

The cover 5 is provided on its top with an upwardly extending annular flange 8, which encircles and serves as a guard for protecting an oscillatable member 9 comprising a disk centrally pivoted to the cover 5.

The oscillatable member 9 is provided with a series of radially arranged rows of perforations 10, which are adapted to be respectively brought into register with the perforations 6, when it is desired to discharge pepper from the chamber 2.

The member 9 is also provided with a series of radially arranged rows of perforations 11 adapted to be respectively brought into register with the perforations 7, when it is desired to dispense salt.

Preferably the perforations 6 and 7 are so located relatively to each other that a radial line extending through a set of perforations 6 will, in the position of the oscillatable member 9, shown in Fig. 5, be overlapped by a set of perforations 7. The perforations 10 and 11 are preferably arranged in radial lines, so that when the oscillatable member 9 is turned to the position shown in Fig. 5, the perforations 10 will be in register with the perforations 6, and the perforations 11 will be in register with the perforations 7. In this position of the member 9, salt and pepper may be simultaneously delivered from the two chambers 3 and 2 respectively.

Upon turning the member 9 for the position shown in Fig. 4, the perforations 11 will register with the perforations 7, but the perforations 10 will not be in register with the perforations 6. In the position shown in Fig. 4, only salt may be discharged.

When the member is in the position shown in Fig. 6, the perforations 10 and 6 will be in register, but the perforations 11 and 7 will not be in register with each other. In this position, only pepper may be discharged.

In the position shown in Fig. 3, the perforations 10 and 11 will not register with the perforations 6 and 7, respectively, and the oscillatable member 9 will be in the wholly closed position.

For the purpose of easily turning the oscillatable member 9 diametrically opposite portions of its periphery are respectively provided with laterally extending projections 12, which respectively extend through two notches 13 provided in the annular flange 8.

The member 9 is provided with a downwardly extending rounded projection 14, which is adapted to enter consecutively two depressions 15 and 16 which are provided in the upper side of the cover 5 and which are so arranged that the projection 14 will enter the said depressions 15 and 16 when the member 9 is in the positions respectively shown in Figs. 4 and 5. The member 9 will thus be yieldingly held in these two positions, so as to prevent its accidental dislodgment therefrom.

The opposite ends of the notches 13 respectively limit the turning movement of the member 9 when the latter is turned to the positions shown in Figs. 3 and 6.

I do not limit my invention to the structure shown and described, as modifications, within the scope of the appended claims, may be made without departing from the spirit of my invention.

What I claim is:—

1. A salt and pepper dispenser provided with two chambers having open ends, a cover normally closing said open ends and having two sets of discharge perforations respectively communicating with said chambers, and an oscillatable member pivoted to said cover and having two sets of perforations so arranged that, with the oscillatable member in one position, both sets of perforations therein will register respectively with the two sets of perforations in the cover, and when the oscillatable member is moved to another position, only one set of perforations will be in register with the perforations in the cover with which they coöperate, the arrangement of the perforations being such that with the oscillatable member in still another position, none of the perforations in the cover will be in register with the perforations in the oscillatable member.

2. A salt and pepper dispenser provided with two chambers having open ends, a cover normally closing said ends and provided with two sets of discharge perforations respectively communicating with said chambers and having an upwardly extending annular flange, and an oscillatable member pivoted to the upper side of said cover and encircled by said flange and provided with two sets of perforations, so arranged that, when the oscillatable member is in one position, one set of its perforations will register with one set of the perforations in the cover, and when the oscillatable member is in another position, the other set of its perforations will register with the other set of the perforations in the cover, and when moved to a third position, the two sets of perforations in the oscillatable member will both be in register with the two sets of perforations respectively in the cover, the oscillatable member and the cover being provided with interlocking means by which the oscillatable member will be yieldingly held from moving from either of the said three positions.

3. A salt and pepper dispenser provided with two chambers each having a set of discharge perforations, and an oscillatable member provided with two sets of perforations adapted to register alternately respectively and also simultaneously with the two sets of perforations of said chambers when the oscillatable member is moved consecutively to three positions.

4. A salt and pepper dispenser provided with two chambers each having a set of discharge perforations, an oscillatable member provided with two sets of perforations adapted to register alternately and also simultaneously with the two sets of perforations respectively of said chambers, and means for yieldingly holding the oscillatable member from moving from the operative positions to which it is adjusted.

5. A salt and pepper dispenser provided with two chambers each having an open end, a cover for closing said open ends and having two sets of perforations respectively communicating with said chambers and having an upwardly extending annular flange provided in its upper edge with a notch, and an oscillatable member pivoted to the upper side of said cover and encircled by said flange and having two sets of perforations adapted to register alternately and also simultaneously with said two sets of perforations respectively of the cover, the oscillatable member having a peripheral projection extending through said notch and beyond the periphery of said flange by which the oscillatable member may be oscillated, the oscillatable member and the cover having means connecting them by which the oscillatable member may be yieldingly held from moving from the positions in which it is operative for placing the perforations in register.

In testimony whereof I have signed my name to this specification.

IRL N. MORRIS.